United States Patent
Osborne (10) Patent No.: US 8,820,767 B1
(45) Date of Patent: Sep. 2, 2014

(54) TRAILER WITH HEIGHT-ADJUSTING MECHANISM

(75) Inventor: Kelly Osborne, Jackson, MI (US)

(73) Assignee: Raizer Engineering, LLC, Jackson, MI (US)

(*) Notice: Subject to any disclaimer, the term of this patent is extended or adjusted under 35 U.S.C. 154(b) by 253 days.

(21) Appl. No.: 13/232,110

(22) Filed: Sep. 14, 2011

Related U.S. Application Data (63) Continuation-in-part of application No. 12/424,876, filed on Apr. 16, 2009, now abandoned.

(60) Provisional application No. 61/124,349, filed on Apr. 16, 2008.

(51) Int. Cl.
*B60G 11/22* (2006.01)
*B62D 61/12* (2006.01)

(52) U.S. Cl.
CPC .............. *B60G 11/225* (2013.01); *B62D 61/12* (2013.01)
USPC .................. 280/414.1; 280/414.5; 280/43.13; 280/124.166

(58) Field of Classification Search
CPC ............................. B60G 11/225; B62D 61/12
USPC ............... 280/414.1, 656, 43.1, 43.13, 43.14, 280/43.17, 43.22, 43.24, 414.5, 43.11, 280/124.13, 124.166, 124.169; 414/482, 414/483, 485
See application file for complete search history.

(56) References Cited

U.S. PATENT DOCUMENTS

| | | | |
|---|---|---|---|
| 2,631,863 A | 3/1953 | Tranter et al. | |
| 2,779,602 A * | 1/1957 | Kimbro et al. | 280/43.18 |
| 2,806,710 A * | 9/1957 | Mascaro | 280/414.5 |
| 2,876,922 A | 3/1959 | Holiday | |
| 4,006,833 A | 2/1977 | Neukom et al. | |
| 4,125,198 A | 11/1978 | Landoll | |
| 4,593,840 A | 6/1986 | Chown | |
| 5,161,814 A | 11/1992 | Walker | |
| 5,476,274 A | 12/1995 | Oberlander | |
| 5,823,558 A | 10/1998 | Shoquist | |
| 5,863,049 A | 1/1999 | Mahvi | |
| 6,450,522 B1 | 9/2002 | Yamada et al. | |
| 6,588,778 B1 * | 7/2003 | McLaughlin | 280/124.13 |
| 6,592,139 B1 | 7/2003 | Shanahan | |
| 6,616,167 B2 | 9/2003 | Guiet | |
| 8,267,410 B1 | 9/2012 | Stutz et al. | |
| 8,360,448 B2 * | 1/2013 | Lariviere | 280/86.75 |
| 2005/0184485 A1 | 8/2005 | Timmermans | |

OTHER PUBLICATIONS

Dexter Axle Catalog Excerpt, Date Unknown.

* cited by examiner

*Primary Examiner* — Anne Marie Boehler
(74) *Attorney, Agent, or Firm* — Young Basile Hanlon & MacFarlane P.C.

(57) ABSTRACT

A height adjusting mechanism for changing the height of a load supporting portion of a trailer. An axle is rotatably connected to a trailer frame of the trailer for rotation between a towing position and a loading position. The axle has a first portion and a pair of axle shafts that are resiliently mounted with respect to the first portion for rotation over a limited angular range of motion and are biased toward a neutral position. A pair of opposed pivot arms are rotatable in response to rotation of the axle between the towing position and the loading position. The pivot arms are rotatable with the axle shaft of the axle in response to rotation of the axle shaft with respect to the central portion of the axle.

19 Claims, 7 Drawing Sheets

TRAILER WITH HEIGHT-ADJUSTING MECHANISM

CROSS-REFERENCE TO RELATED APPLICATIONS

This application is a continuation-in-part of U.S. patent application Ser. No. 12/424,876, filed on Apr. 16, 2009, now abandoned which claims the benefit of U.S. Provisional Patent Application Ser. No. 61/124,349, filed on Apr. 16, 2008.

FIELD OF THE INVENTION

The invention pertains to load-carrying trailers designed to be towed behind a motor vehicle, and more specifically, to such trailers having mechanisms for repositioning the load-carrying deck.

BACKGROUND OF THE INVENTION

Load-carrying trailers designed to be towed behind vehicles are well known. While trailers were used extensively long before motor vehicles were popularized in the twentieth century, use of trailers has increased dramatically in the past hundred years. Naturally, this dramatic increase in trailer use has resulted in development of a large array of trailer designs of varying configurations, many of which are specially adapted to perform a specific function or to be utilized in conjunction with a specific activity.

A very common trailer design incorporates a substantially flat bed or deck on which a load to be carried is placed. Such trailers are typically equipped with a frame, one or more axles affixed to said frame, a tongue or other device for connecting the trailer to a towing vehicle, and a bed or deck on which a load may be positioned and secured.

To ensure that the load-carrying portions of the trailer do not contact the surface on which the trailer is being operated, the wheels and axles of the trailer are generally designed to position the frame and the load-carrying deck some distance above the surface on which the trailer is operated. The result is that the load-carrying surface of the trailer is elevated in relation to the ground. Thus, when the trailer is to be loaded or unloaded, the intended load must be lifted from ground level to the level on which the trailer deck or bed is disposed or vice versa. For lightweight objects, this is not a significant problem, since those objects can simply be manually moved from ground level to trailer deck level. For heavier objects, however, such as vehicles, including motorcycles, manual lifting of the intended load is not practical.

In response to this problem, a number of methods have been developed for facilitating the loading of cargo onto the deck or bed of a trailer. In one scheme, the trailer bed and/or frame are pivotally mounted in relation to the trailer axle, allowing the rearmost edge of the trailer deck to be rotated down into contact with the ground. This allows the cargo to be rolled or slid from the ground surface to the deck of the trailer. Once the load has been so transferred, the bed and/or frame can be pivoted to a more or less horizontal position. While this system is simple, it relies upon pivoting the deck of the trailer with respect to the axle of the trailer. Because the distance between the axle of the trailer and the rearmost edge of the trailer is typically quite short, the deck of the trailer is disposed at a steep incline when the rearmost edge of the trailer is in contract with the ground. Thus, due to the angle of the trailer deck it is often awkward or difficult to transfer the load up the incline created by pivoting the trailer deck with respect to the axle of the trailer.

Another technique which is commonly used is the addition of removable or extensible ramp elements which may be affixed to the back edge of the trailer deck. Such ramps or extensions may be completely removable or may be hinged to the rear edge of the trailer and pivoted into the loading and transport positions as needed. While this methodology is simple, it is subject to the same limitations of the tilting frame/bed trailer arrangement above-described in that the ramp elements often present an incline over which it may be difficult to maneuver cargo to be loaded onto the trailer.

It is known, therefore, to create trailers having axles that adjust in height in relation to a trailer bed. However, known systems are unduly complex, giving rise to high cost and high maintenance requirements. Furthermore, known systems do not provide a simple, convenient means for operation of the height adjustment feature.

SUMMARY OF THE INVENTION

Height adjusting mechanisms for changing the height of a load supporting portion of a trailer with respect to an external surface are taught herein.

One height adjusting mechanism for changing the height of a load supporting portion of a trailer with respect to an external surface includes an axle and a pair of opposed pivot arms. The trailer has a trailer frame that has a rear end, and the trailer frame supports the load supporting portion of the trailer. An axle is rotatably connected to the trailer frame and mounted thereto for rotation about a pivot axis that extends through the axle and remains in a fixed position with respect to the trailer frame between a towing position and a loading position. The axle has a first portion and a pair of axle shafts that are resiliently mounted with respect to the first portion for rotation over a limited angular range of motion and are biased toward a neutral position. Each of a pair of opposed pivot arms has a first end connected to the one of the axle shafts of the axle and a second end that is rotatable about the pivot axis. The second ends of the pivot arms define a wheel axis therebetween. The pivot arms are rotatable in response to rotation of the axle between the towing position, wherein the load supporting portion of the trailer is disposed at a first elevation with respect to the wheel axis, and the rear end of the trailer is vertically spaced from the external surface, and the loading position, wherein the load supporting portion of the trailer is disposed at a second elevation with respect to the wheel axis, and the rear end of the trailer is positioned adjacent to the external surface. The pivot arms are rotatable with the axle shaft of the axle in response to rotation of the axle shaft with respect to the first portion of the axle.

Another height adjusting mechanism for changing the height of a load supporting portion of a trailer with respect to an external surface is taught herein. The trailer has a trailer frame having a rear end. The trailer frame supports the load supporting portion of the trailer. A pair of substantially cylindrical collars are connected to the trailer frame in a fixed relationship with respect thereto, each collar having an interior surface. An axle extends through the collars. The axle has a substantially square cross section and substantially flat exterior faces. One or more bushings are disposed within each collar. The bushings are interposed between the substantially flat exterior faces of the axle and the interior surface of a respective collar of the pair of collars such that the axles are supported for rotation with respect to the pair of substantially cylindrical collars. A pair of opposed pivot arms each have a first end connected to the one of the axles and a second end that is rotatable about the pivot axis. The second ends of the pivot arms define a wheel axis therebetween. The pivot arms are rotatable in response to rotation of the axle between a towing position, wherein the load supporting portion of the trailer is disposed at a first elevation with respect to the wheel axis, and the rear end of the trailer is vertically spaced from the external surface, and a loading position, wherein the load supporting portion of the trailer is disposed at a second elevation with respect to the wheel axis and the rear end of the trailer is positioned adjacent to the external surface.

DETAILED DESCRIPTION

Figure 1:
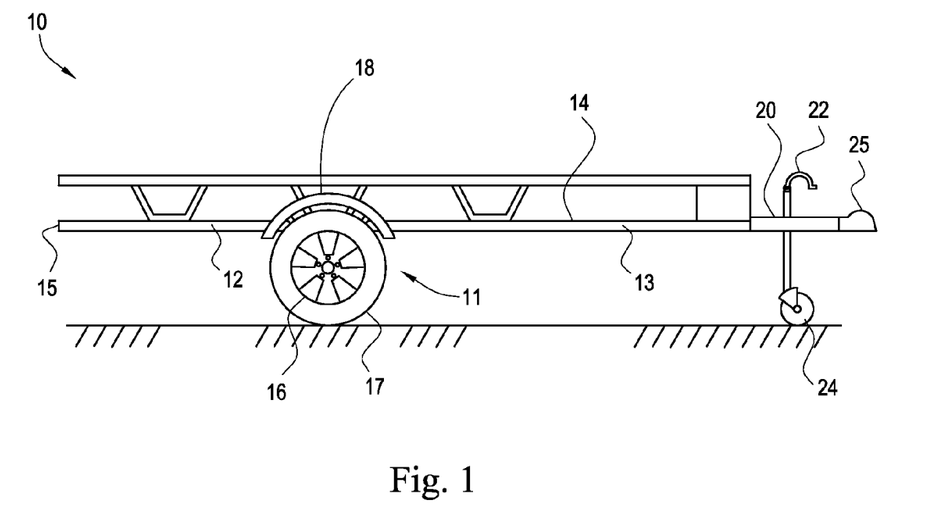
FIG. 1 is a side view of a trailer having a height adjusting mechanism according to the present invention, wherein the height adjusting mechanism is disposed in a towing position.
Figure 2:
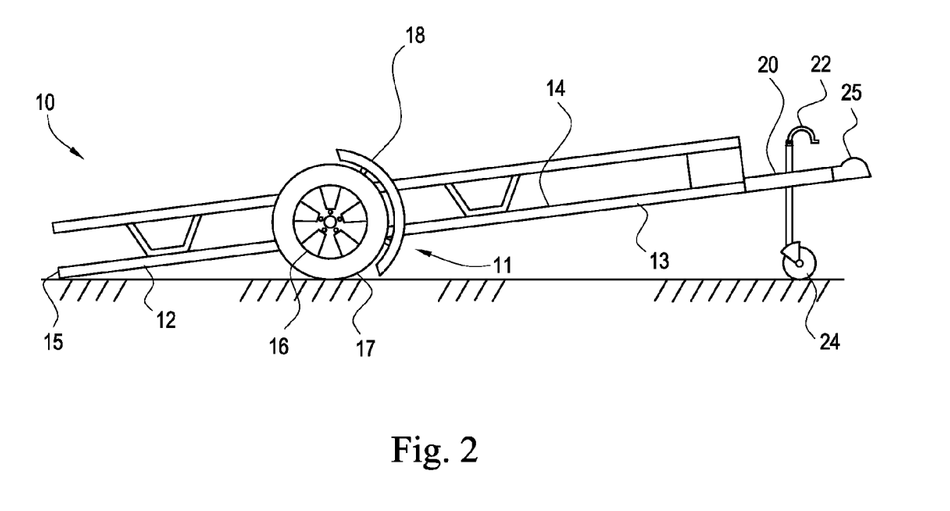
FIG. 2 is a side view of a trailer having a height adjusting mechanism according to the present invention, wherein the height adjusting mechanism is disposed in a loading position.

A full understanding of the present invention will best be achieved by reference to the following description, together with FIGS. 1-2 as above-described. The invention generally comprises a trailer 10 having a height-adjusting mechanism 11 according to the present invention. The trailer 10 is adapted to be towed by a towing vehicle (not shown), and includes a frame 12 that is preferably manufactured of high strength materials such as steel or aluminum, to which a load supporting surface such as a deck 14 is securely attached to provide a surface on which to load and transport cargo. Of course, the deck 14 could be replaced by rails, tracks, or other specialized fixtures designed to receive a particular type of cargo, such as a vehicle. The frame 12 of the trailer 10 includes a pair of lateral sides 13 as well as a rear end 15. The lateral sides 13 are opposed to one another, i.e. positioned opposite one another in the lateral direction of the trailer 10. The trailer 10 also includes a pair of wheels 16, further provided with tires 17 and fenders 18, all of which are connected to the height-adjusting mechanism 11 to allow adjustment of the height of the frame 12 and the deck 14 with respect to the wheels 16 of the trailer 10 between a towing position, as shown in FIG. 1, and a loading position, as shown in FIG. 2. In the towing position, the rear end 15 of the frame 12 of the trailer 10 is vertically spaced from an external surface, such as the ground or a roadway, while at least the rear end 15 of the frame 12 of the trailer 10 is positioned adjacent to the external surface in the loading position. A tongue 20 is secured to the front end of the frame 12. The tongue 20 is typically provided with a tongue support 22 that has a retractable and adjustable positioning wheel 24 that allows the tongue 20 of the trailer 10 to be supported at a desired elevation when the trailer 10 is not connected to the towing vehicle. A hitch receiver 25 is connected to the front end of the tongue 20 to allow the trailer 10 to be connected to the towing vehicle.

Figure 3:
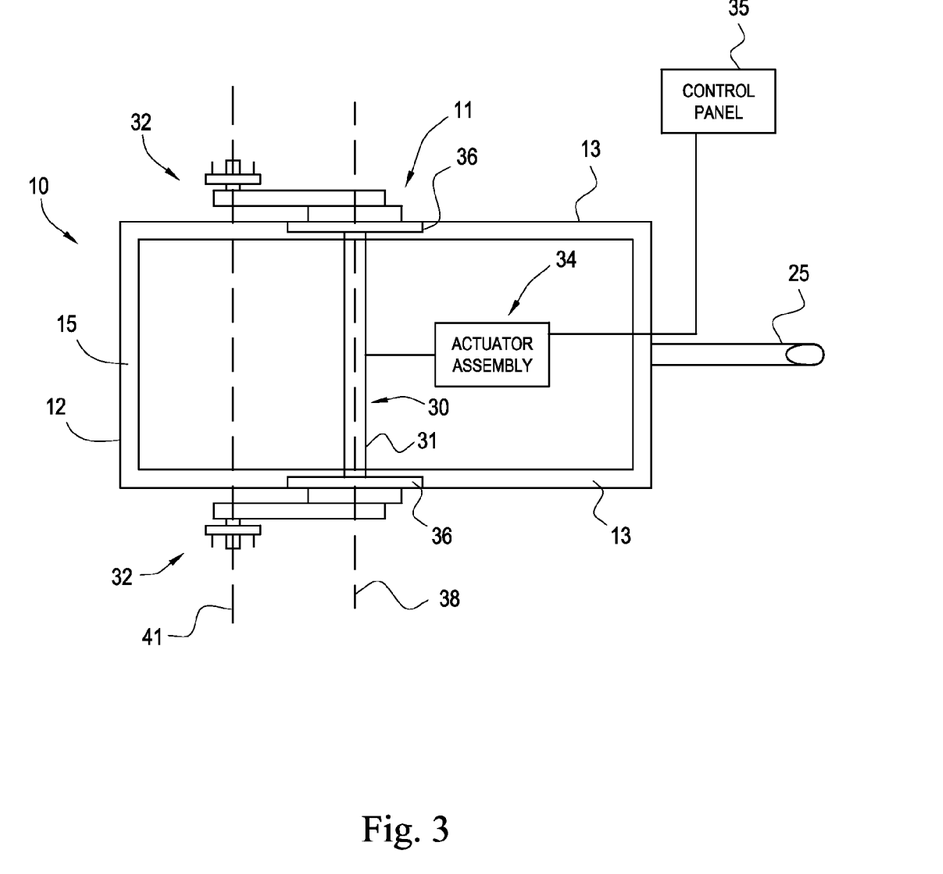
FIG. 3 is a bottom view showing the height adjusting mechanism of the present invention.

To move the trailer 10 between the towing position and the loading position, the height-adjusting mechanism 11 includes an axle 30, a pair of pivot arms 42, and an actuator assembly 34, as shown in FIG. 3. The axle 30 extends through and is supported by a pair of support members, such as frame extensions 36 that are connected to the lateral sides 13 of the frame 12. The axle 30 extends along a pivot axis 38, and the axle 30 is pivotally mounted with respect to the frame extensions 36 such that the axle 30 is able to pivot about the pivot axis 38. During rotation of the axle 30, the pivot axis 38, which extends through the axle 30, does not move with respect to the frame 12 of the trailer 10 or the frame extensions 36. The pivot arms 42 are each connected to the axle 30 at respective, opposite ends of the axle 30 outward of the frame extensions 36. The pivot arms 42 are mounted to the axle 30 for rotation with the axle 30. Together, the pivot arms define a wheel axis 41 that extends between the outer ends of the pivot arms 42. As will be explained further herein, the wheel axis 41 rotates about the pivot axis 38 during movement of the trailer 10 between the towing and loading positions.

Figure 4:
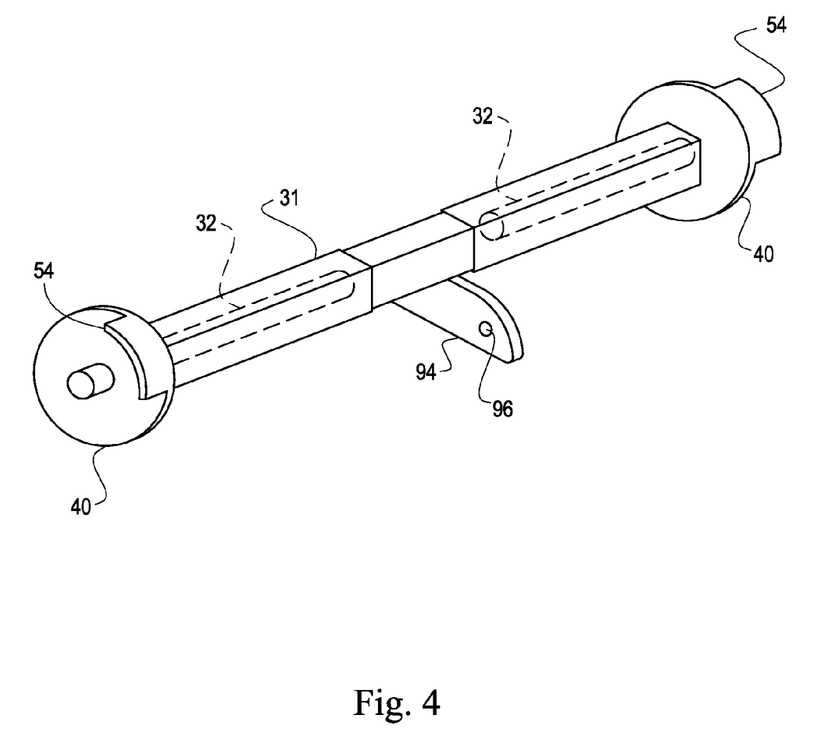
FIG. 4 is a perspective view showing an axle.

As shown in FIG. 4, the axle 30 includes a central portion 31, a pair of axle shafts 32, and a base plate 40. The central portion 31 and the base plate 40 are fixed and immovable with respect to one another. The axle shafts 32 can be fixed with respect to the central portion 31. In some embodiments, however, the axle shafts 32 are resiliently mounted with respect to the central portion 31 to provide a small measure of pivotal rotation with respect to the central portion 31 as part of a torsional suspension system, as will be explained herein. Thus, the central portion 31 and the base plate 40 can define a first portion of the axle 30, where the axle shafts 32 are rotatable with respect to the first portion of the axle 30. Regardless, the axle shafts 32 will rotate substantially in unison with the remainder of the axle 30 when it rotates between the towing position and the loading position, subject to some degree of relative rotation of the axle shafts 32 if they are resiliently mounted.

The central portion 31 extends laterally across the frame 12 of the trailer 10, spanning most or all of the distance between the frame extensions. In one example, the central portion 31 is a unitary member, fabricated either as a single piece structure or multiple pieces that are rigidly and fixedly connected to one another. The central portion 31 can be a square or rectangular tubular member with a hollow interior. A flange 94 is connected to the central portion 31 for use in driving rotation of the axle 30 between the loading position and the towing position, as will be described further herein.

The axle shafts 32 are disposed within the central portion 31 and are seated in opposite ends of the central portion 31. An end portion 44 of each axle shaft 32 extends outward from the central portion 31. The axle shafts 32 can be formed with any desired cross sectional geometry. In the illustrated embodiments, the end portions 44 of the axle shafts 32 have a round cross section, but this cross section may or may not be present along the entire length of the axle shafts 32, as will be explained herein.

Each base plate 40 is a thin, plate-like member. The base plates 40 are connected to the central portion 31 of the axle 30 for rotation in unison therewith.

Figure 5:
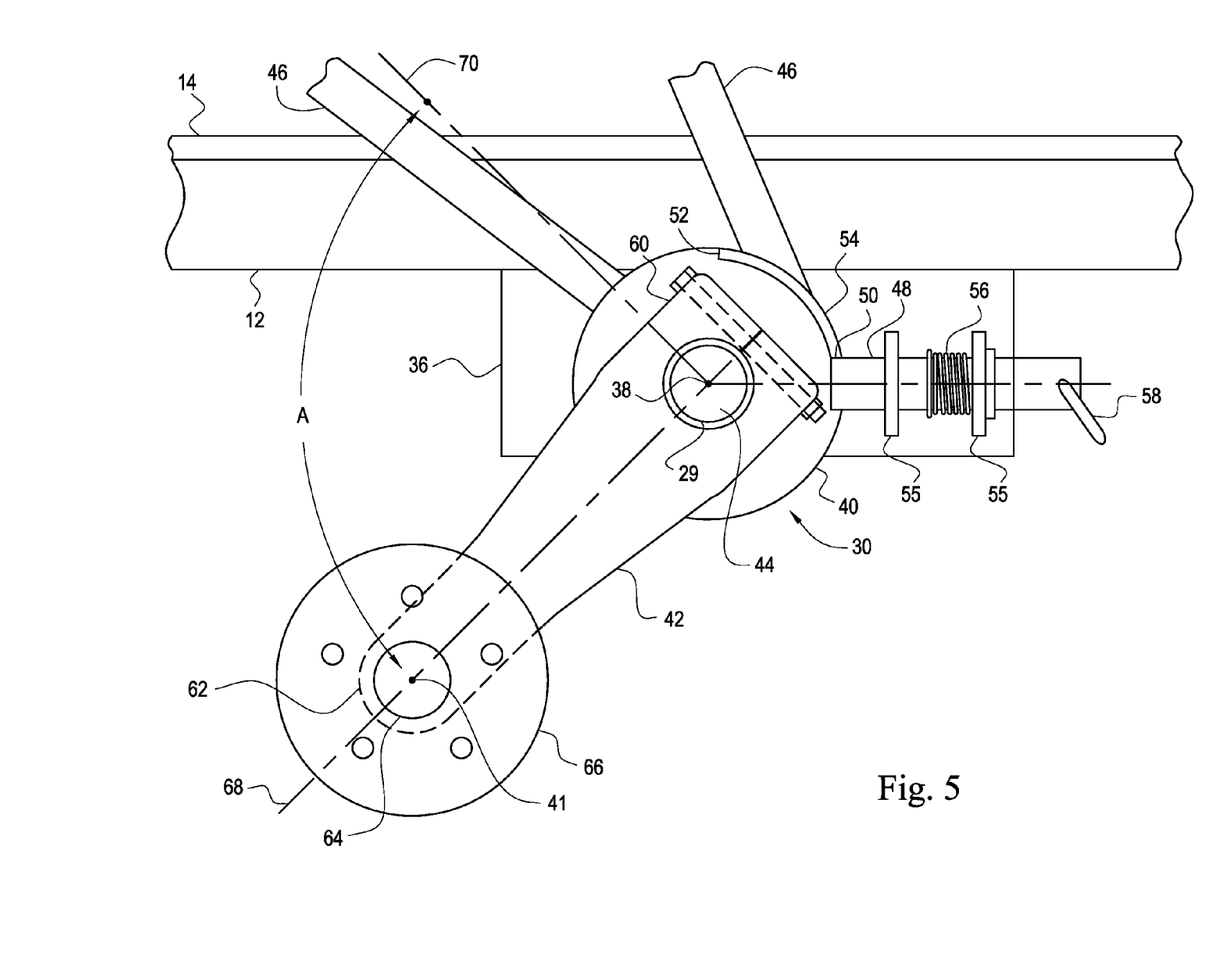
FIG. 5 is a side view of part of the height adjusting mechanism according to the present invention.
Figure 6:
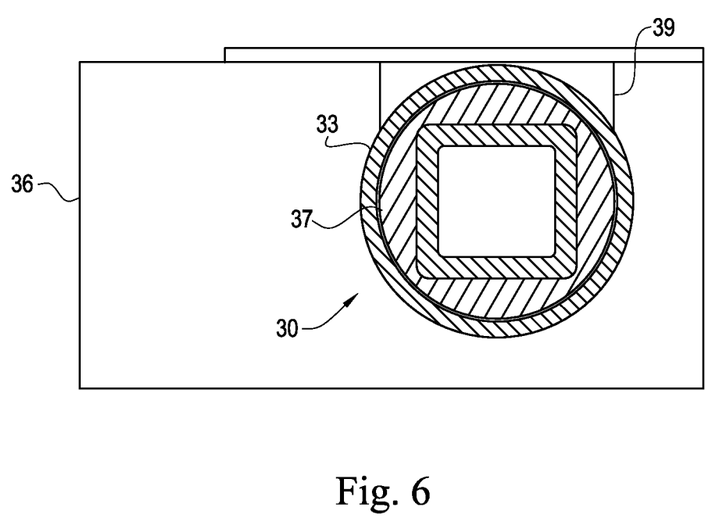
FIG. 6 is a side cross section view showing mounting of the axle of the height adjusting mechanism according to the present invention.

As shown in FIGS. 5-6, the axle 30 is supported by the frame extensions 36 for rotation with respect to the frame 12 of the trailer 10. The central portion 31 of the axle 30 extends through each of the frame extensions 36, and the base plates 40 are positioned outward from the frame extensions 36.

In order to support the axle 30, a substantially cylindrical collar 33 is connected to each of the frame extensions 36. Each of the collars 33 is rigidly attached to one of the frame extensions 36. The collars 33 can be connected to the frame extensions 36 by means such as welding or fasteners. A bracket 39 can be connected to the frame extensions 36 and to the exteriors of the collars 33 to further secure the collars 33 to the frame extensions 36.

The collars 33 extend along the pivot axis 38 and are oriented perpendicularly with respect to the frame extensions 36. The collars 33 have hollow interiors, and thus define openings through the frame extensions 36. The cross section of each collar 33 is substantially circular in a direction that is substantially perpendicular to the pivot axis 38.

The central portion 31 of the axle 30 extends through each of the collars 33. The central portion 31 can have a substantially square cross section with four substantially flat exterior faces. In order to allow rotation of the central portion 31 with respect to the collars 33, a bushing 37 is installed within each of the collars 33. Each bushing 37 is interposed between the substantially flat exterior faces of the central portion 31 and the interior surface of the collar 33.

Figure 7:
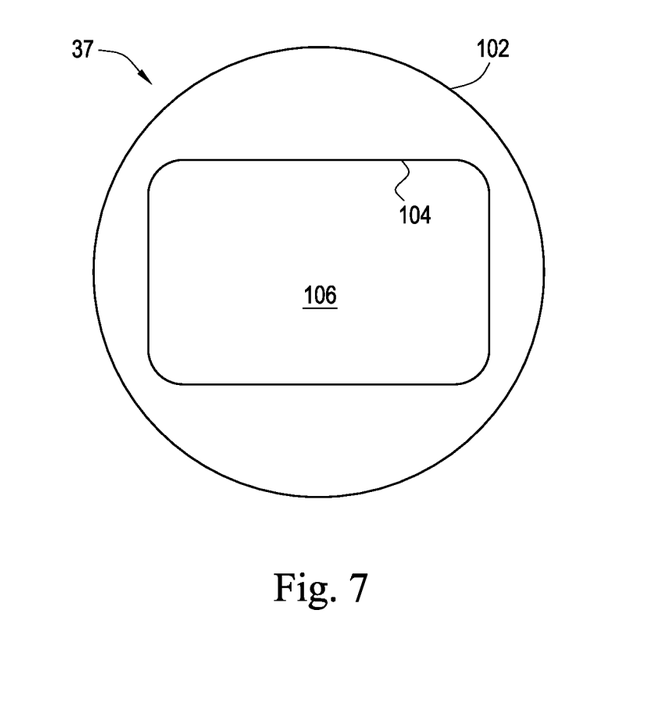
FIG. 7 is a side view showing a bushing.

As shown in FIG. 7, each bushing 37 is substantially in the shape of a cylinder, having a substantially arcuate exterior surface 102 and four substantially flat interior surfaces 104 that define a substantially square passageway 106 in which the central portion 31 is received. Thus, the substantially square central portion 31 extends through each of the bushings 37. When the central portion 31 rotates with respect to the collars 33, the bushings 37 also rotate with respect to the collars 33. In a lateral direction, the bushings 37 can be held in place with respect to the central portion 31 by tabs (not shown) that are welded to the central portion 31. Accordingly, by provision of the bushing 37 in each of the collars 33, the axle 30 is supported with respect to the frame extensions 36 and is able to rotate with respect to the frame extensions 36.

Although one bushing 37 is shown within each collar 33, four bushings 37 could be provided within each collar, each in the form of a circular segment having an arcuate side and a flat side. Thus, it is sufficient that one or more bushings 37 be provided between the axle 30 and each collar 33.

In order to connect the fender 18 to the height-adjusting mechanism 11, fender support members 46 connect the fender 18 to the base plate 40. Thus, the fender 18 rotates along with its respective base plate 40 when the trailer moves between the towing and loading positions.

In order to restrain the pivot arms 42 from moving to the loading position from the towing position or vice-versa, a locking pin 48 is movably connected to the frame extension 36 and is selectively engageable with each of a first stop 50 and a second stop 52 that are formed on the base plate 40. In particular, the first stop 50 and the second stop 52 may be defined by the ends of an arcuate flange 54 that extends outward from the base plate 40 such that the first stop 50 is positioned adjacent to the locking pin 48 when the trailer 10 is in the towing position and the second stop 52 is positioned adjacent to the locking pin 48 when the trailer 10 is in the loading position. The locking pin 48 is mounted with respect to the frame extension 36 by a pair of carriers 55. The locking pin 48 includes a spring 56 that biases the locking pin 48 into an engaged position with respect to the stops 50, 52 and a grip 58 located opposite the base plate 40 to allow the user to move the locking pin 48 into and out of engagement with the stops 50, 52.

Each pivot arm 42 is seated on and rigidly connected to the end portion 44 of a respective one of the axle shafts 32 outward of the base plate 40 for rotation in unison with the end portion 44 of the axle shaft 32. However, it should be understood that the base plate 40 and the pivot arm 42 could be connected to one another or formed integrally with one another in embodiments where the axle shafts 32 are non-rotatable with respect to the central portion 31 of the axle 30. The pivot arm 42 can be connected to the end portion 44 of the axle shaft 32 using a pivot arm clamp 60 that is tightened with respect to the end portion 44 of the axle shaft 32 using conventional fasteners, such as a nut and bolt. At an outer end 62 of the pivot arm 42, a stub axle 64 is provided. In order to mount the wheels 16 for rotation with respect to the pivot arm 42, a hub 66 is pivotally mounted on the stub axle 64, and the wheels 16 are attached to the hubs 66 in a well-known fashion.

When the trailer 10 is moved from the towing position to the loading position, the axle 30 rotates, thus rotating the pivot arms 42. In doing so, the stub axles 64, through which the wheel axis 41 is defined, move through an arc A of approximately 90° such that the pivot arms 42 are moved from a first alignment 68 to a second alignment 70. When the pivot arms 42 are in the towing position, the wheel axis 41 extends under the deck 14 of the trailer 10. When the pivot arms 42 are in the loading position, the wheel axis 41 extends over the load-supporting deck 14 of the trailer 10.

In order to drive the pivot arms 42 between the towing position and the loading position, the height-adjusting mechanism 11 includes an actuator assembly 34. The actuator assembly 34 is operatively connected to the axle 30 in such as manner as to allow the actuator assembly 34 to cause rotation of the axle 30 and the pivot arms 42 around the pivot axis 38. The actuator assembly 34 may include any structure now known or hereafter invented capable of performing this function. For example, the actuator assembly could include an electrical, pneumatic, hydraulic or manual actuator that directly rotates the axle 30 or impart linear motion to a crank or similar structure (not shown in FIG. 3) that is attached to the axle 30 to convert the linear motion to rotational motion. In electrical, pneumatic or hydraulic configurations, a control panel 35 may be operatively connected to the actuator assembly 34 to control operation of the actuator assembly 34. In a manually operated mechanism, the actuator assembly 34 may include a device such as a crank with an associated gear box to permit the actuator assembly 34 to be operated without electrical, pneumatic or hydraulic power sources. It will also be appreciated that in association with the gear box, or in place thereof, may be substituted a chain drive mechanism providing mechanical advantages corresponding to or in addition to those of a gear box.

Figure 8A:
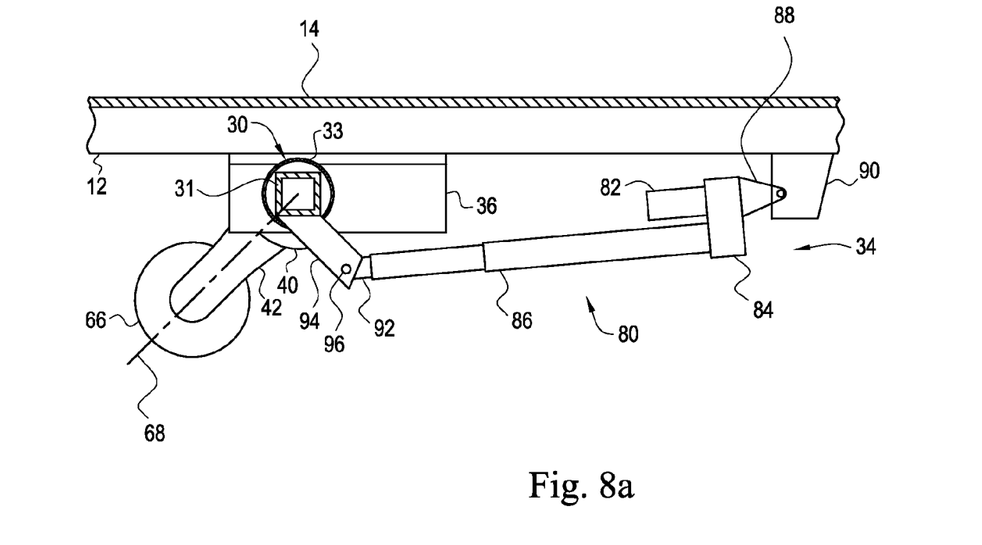
FIG. 8A is a side view of an actuator of the height adjusting mechanism according to the invention, wherein the height adjusting mechanism is disposed in a towing position.
Figure 8B:
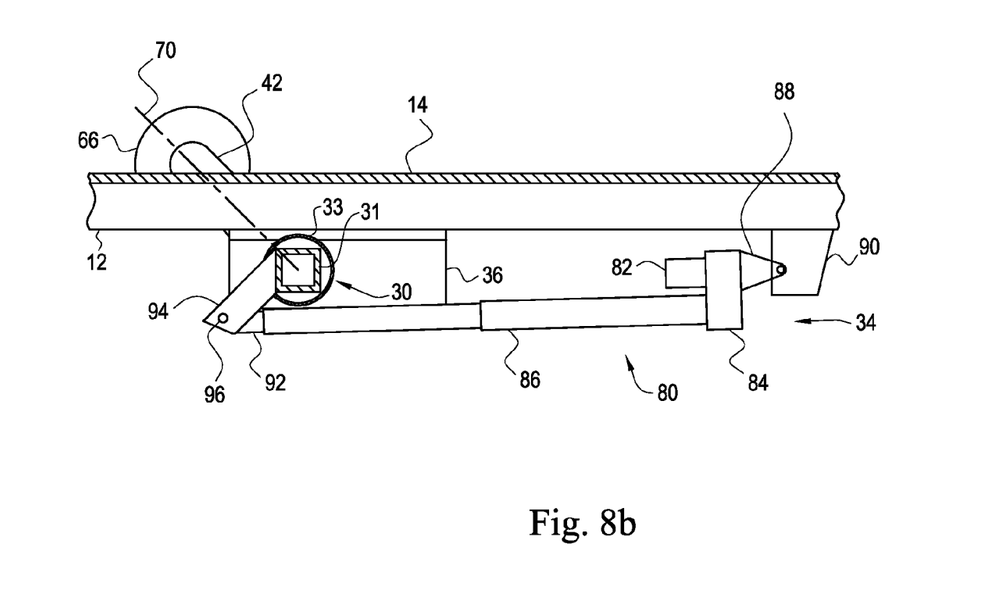
FIG. 8B is a side view of an actuator of the height adjusting mechanism according to the invention, wherein the height adjusting mechanism is disposed in a loading position.

As an example, one embodiment of the actuator assembly 34 may include an electrically operated linear actuator 80, as shown in FIGS. 8A-8B. The linear actuator 80 includes an electric motor 82, a gear box 84, and an actuator shaft 86. The actuator shaft 86 can be a two part actuator shaft. The electric motor 82 is preferably capable of obtaining power from the towing vehicle, typically through an electrical connection available at the exterior of the towing vehicle. Electrical power is routed through the control panel 35 through a wiring harness (not shown) that supplies electrical power to the electric motor 82. The control panel 35 preferably allows movement of the electric motor 82 in two directions of rotation which, by way of the gear box 84 cause extension or retraction of the actuator shaft 86, which may include a jack screw or any other conventional mechanism operable to provide linear extension and retraction in response to rotation. The linear actuator 80 is pivotally mounted to the frame 12 of the trailer 10, for example, by a pivot mount 88 on the gear box 84 that is connected to a mounting member 90 that is provided on the frame 12 by a clevis pin or similar fastener. A mount 92 on the actuator shaft 86 is mounted to a pivotal connection 96 on an end of the flange 94. The flange 94 is rigidly connected to the axle 30 and extends substantially perpendicular to the pivot axis 38. Because the pivotal connection 96 between the flange 94 and the actuator shaft 86 is opposite and spaced from the axle 30, extension and retraction of the actuator shaft 86 is operable to rotate the axle 30 such that the axle 30 and the pivot arms 42 are disposed in the towing position when the actuator shaft 86 is in a retracted position and disposed in the loading position when the actuator shaft 86 is in an extended position. In this fashion, actuation of the actuator assembly 34 results in positioning of the trailer 10 in the loading position as shown in FIG. 2 or the towing position as shown in FIG. 1.

Figure 9:
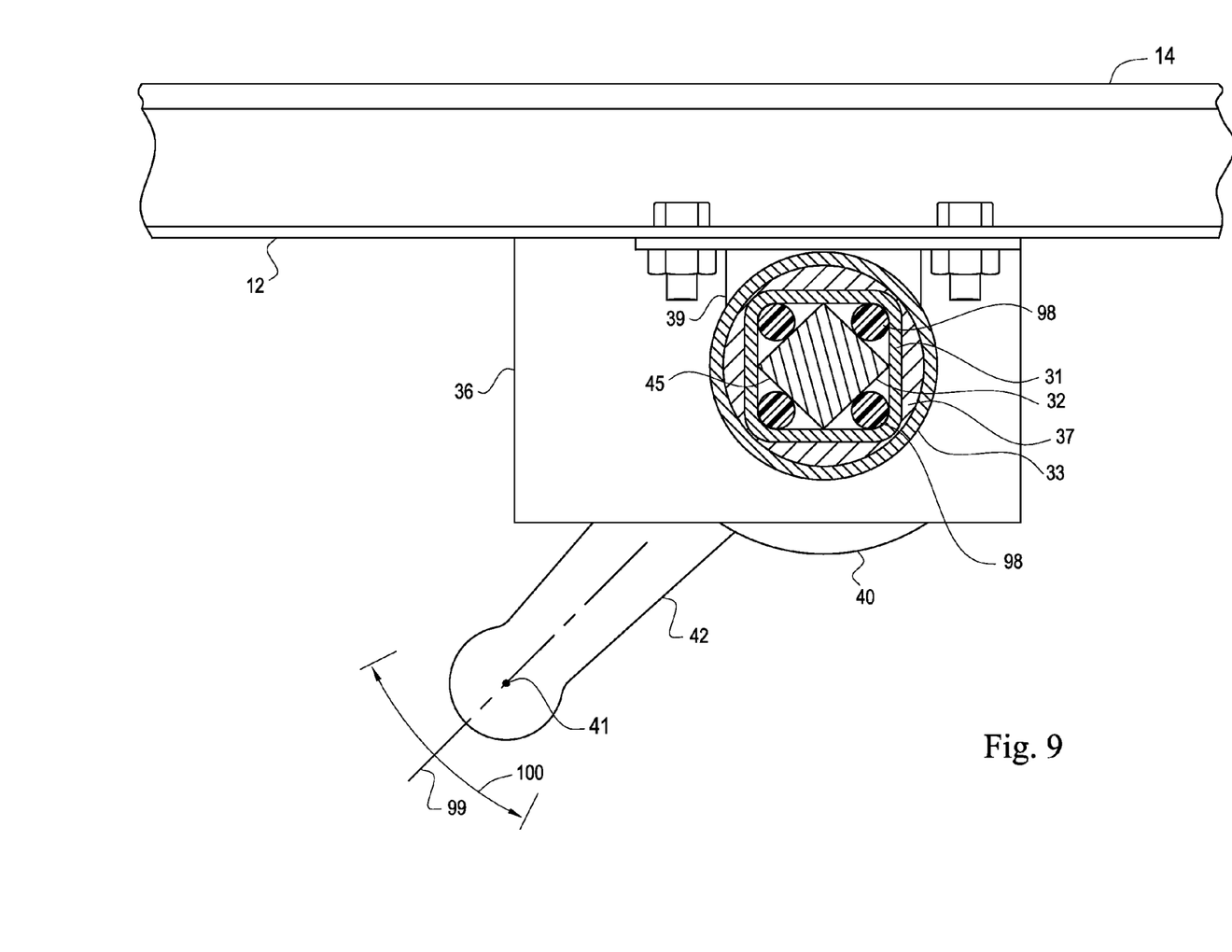
FIG. 9 is a side cross section view showing an axle that incorporates a torsional suspension component.

As previously noted, the axle 30 can incorporate a torsional suspension by resiliently mounting the axle shafts 32 with respect to the central portion 31 of the axle 30. As shown in FIG. 9, an inner portion 45 of each of the axle shafts 32 is disposed within the central portion 31 of the axle 30. One or more resilient biasing members 98 are disposed in engagement with both the central portion 31 and the inner portion 45 of each axle shaft. The resilient biasing members 98 can be cords that are fabricated from a compressible elastomeric material. In the illustrated embodiment, four resilient biasing members 98 are provided for each axle shaft 32, and the inner portion 45 of the axle shaft 32 has a square cross-section that is rotated 45° with respect to the square cross section of the central portion 31 of the axle 30. Also in the illustrated embodiment, the four resilient biasing members have round cross sections and are positioned near the corners of the square cross-section defined by the central portion 31 of the axle 30. It should be understood, however, the many configurations of the axle shafts 32 and resilient biasing members 98 can be utilized and that the number and configuration of the resilient biasing members 98 is not critical.

The resilient biasing members 98 bias the axle shafts 32 toward a neutral position 99 with respect to the central portion 31 of the axle 30 (i.e. an unloaded position where the biasing members 98 are not compressed). Compression of the resilient biasing members 98 provides a small degree of pivotal rotation of the axle shafts 32 with respect to the central portion 31 (i.e. small in comparison to the degree of travel of between the loading and towing positions, but sufficient for performance or shock-absorbing functions). This small degree of rotation allows travel of the pivot arm 42 across a range of suspension travel 100. The axle shafts 32 can be rotatable in both angular directions away from the neutral position 99. In this manner, the axle shafts 32 are resiliently mounted with respect to the central portion 31 for rotation over a limited angular range of motion, defined by the range of suspension travel 100, and are biased toward the neutral position 99.

Because the axle shafts 32 are resilient mounted with respect to the central portion 31 of the axle 30, the pivot arms 42 can move through the range of suspension travel 100 while the central portion 31 and the base plates 40 remain fixed in place with respect to the frame 12 of the trailer 10. However, the resilient connection between the axle shafts 32 and the central portion 31 does not frustrate rotation of the pivot arms 42 in response to rotation of the central portion 31 and the base plates 40 between the loading position and the towing position. On the contrary, the axle shafts still rotate substantially in unison with the central portion 31 and base plates 40 between the loading position and the towing position.

While the invention has been described in connection with what is presently considered to be the most practical and preferred embodiment, it is to be understood that the invention is not to be limited to the disclosed embodiments, but to the contrary, it is intended to cover various modifications and equivalent arrangements included within the spirit and scope of the appended claims. The scope is to be accorded the broadest interpretation so as to encompass all such modifications and equivalent structures as is performed under the law.

What is claimed is:

1. A height adjusting mechanism for changing the height of a load supporting portion of a trailer with respect to an external surface, the trailer including a trailer frame having a rear end, the trailer frame supporting the load supporting portion of the trailer, the height adjusting mechanism comprising:

an axle rotatably connected to the trailer frame and mounted thereto for rotation about a pivot axis that extends through the axle and remains in a fixed position with respect to the trailer frame between a towing position and a loading position, the axle having a first portion and a pair of axle shafts that are resiliently mounted with respect to the first portion for rotation over a limited angular range of motion and are biased toward a neutral position;

a pair of opposed pivot arms, each having a first end connected to the one of the axle shafts of the axle and a second end rotatable about the pivot axis, the second ends of the pivot arms each defining a respective wheel axis, the pivot arms rotatable in response to rotation of the axle between the towing position, wherein the load supporting portion of the trailer is disposed at a first elevation with respect to each respective wheel axis and the rear end of the trailer is vertically spaced from the external surface, and the loading position, wherein the load supporting portion of the trailer is disposed at a second elevation with respect to each wheel axis, the rear end of the trailer is positioned adjacent to the external surface, and the pivot arms are rotatable with the axle shafts of the axle in response to rotation of the axle shafts with respect to the first portion of the axle;

an arcuate flange connected to the first portion of the axle adjacent to one of the pivot arms for rotation in unison with the axle, the flange extending from a first end that defines a first stop to a second end that defines a second stop; and a restraining element connected to the trailer frame and selectively engageable with the first stop and the second stop, wherein engagement of the restraining element with the first stop restrains the axle from rotating toward the loading position from the towing position and engagement of the restraining element with the second stop restrains rotation the axle from rotating toward the towing position from the loading position.

2. The height adjusting mechanism of claim 1, further comprising:

an actuator assembly operatively connected to the first portion of the axle for rotating the first portion of the axle, the axle shafts, and the pivot arms between the towing position and the loading position.

3. The height adjusting mechanism of claim 2, further comprising:

the actuator assembly including a linear actuator; and a flange connected to the axle and to the linear actuator, wherein extension and retraction of the linear actuator is operable to cause rotation of the axle.

4. The height adjusting mechanism of claim 1, wherein the axle is disposed below the load supporting portion of the trailer.

5. The height adjusting mechanism of claim 1, further comprising:
the trailer frame having a pair of opposed lateral sides; and
each pivot arm of the pair of opposed pivot arms disposed outboard of a respective lateral side of the pair of opposed lateral sides of the trailer frame.

6. The height adjusting mechanism of claim 1, further comprising:
a wheel operatively connected to each of the pivot arms at the second ends thereof, wherein the wheels are mounted along each respective wheel axis.

7. The height adjusting mechanism of claim 1, wherein the axle shafts are at least partially disposed within the first portion of the axle.

8. The height adjusting mechanism of claim 7, wherein the axle includes at least one resilient biasing member that is operable to bias the axle shafts toward the neutral position.

9. The height adjusting mechanism of claim 7, wherein the each axle shaft is resiliently mounted to the first portion of the axle by a respective resilient biasing member that is operable to bias the axle shafts toward the neutral position.

10. The height adjusting mechanism of claim 1, where the resilient mounting of the axle shafts with respect to the first portion of the axle allows the second ends of the pivot arms to rotate through a limited range of travel in order to perform a suspension function.

11. A height adjusting mechanism for changing the height of a load supporting portion of a trailer with respect to an external surface, the trailer including a trailer frame having a rear end, the trailer frame supporting the load supporting portion of the trailer, the height adjusting mechanism comprising:
an axle rotatably connected to the trailer frame and mounted thereto for rotation about a pivot axis that extends through the axle and remains in a fixed position with respect to the trailer frame between a towing position and a loading position, the axle having a first portion and a pair of axle shafts that are resiliently mounted with respect to the first portion for rotation over a limited angular range of motion and are biased toward a neutral position;
a pair of opposed pivot arms, each having a first end connected to the one of the axle shafts of the axle and a second end rotatable about the pivot axis, the second ends of the pivot arms each defining a respective wheel axis, the pivot arms rotatable in response to rotation of the axle between the towing position, wherein the load supporting portion of the trailer is disposed at a first elevation with respect to each respective wheel axis and the rear end of the trailer is vertically spaced from the external surface, and the loading position, wherein the load supporting portion of the trailer is disposed at a second elevation with respect to each wheel axis, the rear end of the trailer is positioned adjacent to the external surface, and the pivot arms are rotatable with the axle shafts of the axle in response to rotation of the axle shafts with respect to the first portion of the axle;
a pair of substantially cylindrical collars connected to the trailer frame in a fixed relationship with respect thereto, each collar having an interior surface, wherein at least part of the axle has a substantially square cross section and substantially flat exterior faces; and
one or more bushings disposed within each collar, wherein the bushings are interposed between the substantially flat exterior faces of the axle and the interior surface of a respective collar of the pair of collars, such that the axle is supported for rotation with respect to the pair of substantially cylindrical collars for rotatably connecting the axle to the trailer frame.

12. A height adjusting mechanism for changing the height of a load supporting portion of a trailer with respect to an external surface, the trailer including a trailer frame having a rear end, the trailer frame supporting the load supporting portion of the trailer, the height adjusting mechanism comprising:
a pair of substantially cylindrical collars connected to the trailer frame in a fixed relationship with respect thereto, each collar having an interior surface;
an axle that extends through the collars and along a pivot axis, at least part of the axle having a substantially square cross section and substantially flat exterior faces;
one or more bushings disposed within each collar, wherein the bushings are interposed between the substantially flat exterior faces of the axle and the interior surface of a respective collar of the pair of collars, such that the axle is supported for rotation with respect to the pair of substantially cylindrical collars; and
a pair of opposed pivot arms, each having a first end connected to the axle and a second end rotatable about the pivot axis, the second ends of the pivot arms each defining a respective wheel axis, the pivot arms rotatable in response to rotation of the axle between a towing position, wherein the load supporting portion of the trailer is disposed at a first elevation with respect to each respective wheel axis and the rear end of the trailer is vertically spaced from the external surface, and a loading position, wherein the load supporting portion of the trailer is disposed at a second elevation with respect to each respective wheel axis and the rear end of the trailer is positioned adjacent to the external surface.

13. The height adjusting mechanism of claim 11, further comprising:
a stop connected to the first portion of the axle; and
a restraining element connected to the trailer frame and selectively engageable with the stop to restrain rotation of the first portion of the axle with respect to the trailer frame.

14. The height adjusting mechanism of claim 11, further comprising:
an actuator assembly operatively connected to the first portion of the axle for rotating the first portion of the axle, the axle shafts, and the pivot arms between the towing position and the loading position.

15. The height adjusting mechanism of claim 14, further comprising:
the actuator assembly including a linear actuator; and
a flange connected to the axle and to the linear actuator, wherein extension and retraction of the linear actuator is operable to cause rotation of the axle.

16. The height adjusting mechanism of claim 11, wherein the axle is disposed below the load supporting portion of the trailer.

17. The height adjusting mechanism of claim 11, further comprising:
the trailer frame having a pair of opposed lateral sides; and each pivot arm of the pair of opposed pivot arms disposed outboard of a respective lateral side of the pair of opposed lateral sides of the trailer frame.

18. The height adjusting mechanism of claim 11, further comprising:
    a wheel operatively connected to each of the pivot arms at the second ends thereof, wherein the wheels are mounted along each respective wheel axis.

19. The height adjusting mechanism of claim 11, wherein the axle shafts are at least partially disposed within the first portion of the axle and the axle includes at least one resilient biasing member that is operable to bias the axle shafts toward the neutral position.

* * * * *